(12) United States Patent
Muppirala et al.

(10) Patent No.: US 8,694,699 B2
(45) Date of Patent: Apr. 8, 2014

(54) PATH SELECTION FOR APPLICATION COMMANDS

(75) Inventors: Kishore Kumar Muppirala, Karnataka (IN); Satish Kumar Mopur, Karnataka (IN); Sumanesh Samanta, Karnataka (IN); Dinkar Sitaram, Karnataka (IN); Ayman Abouelwafa, Folsom, CA (US); Mustafa Uysal, Fremont, CA (US); Arif Merchant, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 199 days.

(21) Appl. No.: 12/794,594

(22) Filed: Jun. 4, 2010

(65) Prior Publication Data

US 2011/0302337 A1 Dec. 8, 2011

(51) Int. Cl.
*G06F 3/00* (2006.01)
*G06F 13/00* (2006.01)

(52) U.S. Cl.
USPC ............. 710/38; 710/2; 710/5; 710/8; 710/15

(58) Field of Classification Search
None
See application file for complete search history.

(56) References Cited

U.S. PATENT DOCUMENTS

| 7,287,134 | B2 | 10/2007 | Miller et al. | |
|---|---|---|---|---|
| 2007/0079021 | A1 | 4/2007 | Dees et al. | |
| 2008/0162735 | A1 | 7/2008 | Voigt et al. | |
| 2009/0150577 | A1 | 6/2009 | Veni et al. | |
| 2009/0228672 | A1* | 9/2009 | Uratani et al. | 711/162 |
| 2010/0223404 | A1* | 9/2010 | Butler et al. | 710/38 |

OTHER PUBLICATIONS

EMC, "Navisphere Quality of Service Manager (NQM)," Oct. 2006, 13 pp.
Gulati et al., "Efficient and Adaptive Proportional Share I/O Scheduling," Nov. 20, 2007, 13 pp.
HP, "HP-UX 11i v3 Mass Storage Stack Enhancements, HP Whitepaper," Feb. 2007, 11 pp.

* cited by examiner

*Primary Examiner* — Scott Sun (57) ABSTRACT

Systems and methods for path selection for application commands are described. To this end, information associated with at least one application command that were processed at least one port of a target device is received. For a subsequent application command, a set of ports of the target device is determined. In one implementation, the set of ports is determined based on information associated with the subsequent application command. Once the set of ports is determined, the subsequent application command is directed to a port selected from the set of ports.

15 Claims, 4 Drawing Sheets

PATH SELECTION FOR APPLICATION COMMANDS

BACKGROUND

Resources such as processing and storage capability and network throughput can be shared across a network of computers. The capability of a network to manage and provide access to resources is indicative of a Quality-of-Service (QoS) of the network. Resources can be managed, for example, by allocation of a traffic capacity or a storage capacity, based on the priority of a request generated by any device connected to the network.

QoS is desirable in a network environment because multiple host devices connected to the network environment issue multiple application commands, which require resources that are limited. The multiple application commands, therefore, compete with each other for the resources. Generally, multiple applications running over dispersed host devices issue commands, such as a storage resource request, a network resource request, or a processing resource request, to one or more target devices. For example, in a typical storage area network (SAN) implementation, host devices use commands to store and/or retrieve data from the target devices, which may include routers, storage devices, processing devices, etc. In such a case, the application commands received from the host devices are prioritized at the target devices to provide an expected QoS. Prioritization of commands can be based on various parameters, such as application level classification of the commands.

The commands received at the target devices are generally executed based on a scheduling module or a scheduler. The scheduler places the incoming commands in multiple queues at various ports of the target devices. The scheduler allocates a fair share, i.e., a recommended proportion, of available resources for the execution of the incoming commands. In order to achieve fairness in resource allocation, the scheduler may allocate resources to at least one incoming command from each queue after a fixed period of time.

In certain cases, the expected QoS may not get achieved. For example, a certain amount of leakage of input/output (I/O) commands may occur from a queue that is low on resource allocation. Accordingly, the execution of the commands or workloads on the target device(s) gets affected thereby affecting their QoS service level agreements (SLAs).

BRIEF DESCRIPTION OF DRAWINGS

The detailed description is provided with reference to the accompanying figures. In the figures, the left-most digit(s) of a reference number identifies the figure in which the reference number first appears. The same numbers are used throughout the drawings to reference like features and components.

DETAILED DESCRIPTION

Systems and methods for path selection for application commands are described herein. In one implementation, the path selection for application commands is provided by allowing the application commands to arrive at a predetermined number of ports of a target device.

The present systems and methods can be implemented in a variety of operating systems, such as HP-UX, and also in a virtual machine (VM) environment implemented using a variety of system architectures, for example, Hyper-V architectures, multi-core architectures, and the like. Devices that can implement the described methods include a diversity of computing devices, such as a server, a desktop personal computer, a notebook or a portable computer, a workstation, a mainframe computer, a mobile computing device and an entertainment device.

In a network environment, one or more host devices send application commands, over one or more networks, to one or more target devices where they are processed. The application commands can be generated by one or more applications executing at the host devices. The application commands can include storage requests, network resource requests, or processing requests. Once the application commands are received at a target device, a scheduler queues the application commands arriving at one or more ports of the target device. Examples of target devices may include, but are not limited to, routers, storage devices, processors, etc.

Generally, the scheduler is controlled by a controller, which may also include a QoS controller. It would be appreciated that the target device may include a plurality of schedulers associated with a plurality of controllers. Each controller on the target device could be hosting multiple ports. Typically, to avoid starvation of application commands in a queue, a scheduler allows at least one application command from each queue to be processed after a fixed period of time. Under normal circumstances, the resource, for example processing resource, storage resource, etc., may get distributed across the various queues with each queue getting a fair share of the resource.

Furthermore, there may be scenarios that require application commands to be routed to selected ports. For example, in certain configurations, a storage device has a fixed number of ports, say eight ports. An associated disk or logical unit number (LUN) may be made visible, i.e., available, only under four ports that are to be selected from the eight ports available with the storage device. In such a case, application commands intended for the associated disk or LUN would be routed to the four ports under which they are available. Other scenarios also include, but are not limited to, implementations based on LUN masking. It may happen that the availability of the associated disk might get dropped at one or more of the four ports. In such cases, the application commands may generate an error while processing.

It may also be a case, that an application command is processed earlier than desired to accomplish its QoS SLA, in other words, is leaked. A command when leaks, i.e., gets processed earlier, results in over-achieving a pre-set QoS associated with the application command. Such an over-achieving by an application command may adversely affect the QoS associated with commands issued by another application. In such cases, it is desirable that the QoS associated with various application commands does not get affected.

It is desirable that the QoS associated with various application commands does not get affected. Systems and methods for path allocation of application commands are described. In one implementation, application commands processed at one or more ports of the target device are detected. In another implementation, application commands that leaked at one or more ports of a target device are detected. Based on the detection, a maximum number of ports of the target device that may receive subsequent application commands similar to the leaked application commands is determined. In another implementation, path allocation for application commands can be implemented based on the application commands that arrive at the ports of the target device. In another implementation, once the maximum number of ports is determined, those many specific ports, at which any subsequent application command similar to the leaked application commands can be directed to, are identified. Information pertaining to these specific ports is provided to all or some of the host devices so that the subsequent application commands are directed to these identified ports.

In this manner, the leakage of application commands, as identified above, is reduced, since the application commands that are prone to leakage will now leak only at a reduced number of ports. It would be appreciated that the number of identified ports forms a set that is a subset of the total number of ports of the target device.

The method may be used for delivering QoS in a storage area network (SAN) environment or in any network environment where applications compete for shared network resources or processing resources, such as access or allocation of bandwidth. Furthermore, the methods as described can also be used for implementations other than preventing application commands from leaking. The method can also be used to monitor and optimize application performance for different user requirements by associating a variable number of paths to one or more ports at the target device, based on the information associated with the application commands.

The manner in which the path selection for application commands is implemented shall be explained in detail with respect to the FIGS. 1-4. While aspects of systems and methods can be implemented in any number of different computing systems, environments, and/or configurations, the embodiments are described in the context of the following exemplary system architecture(s).

Figure 1:
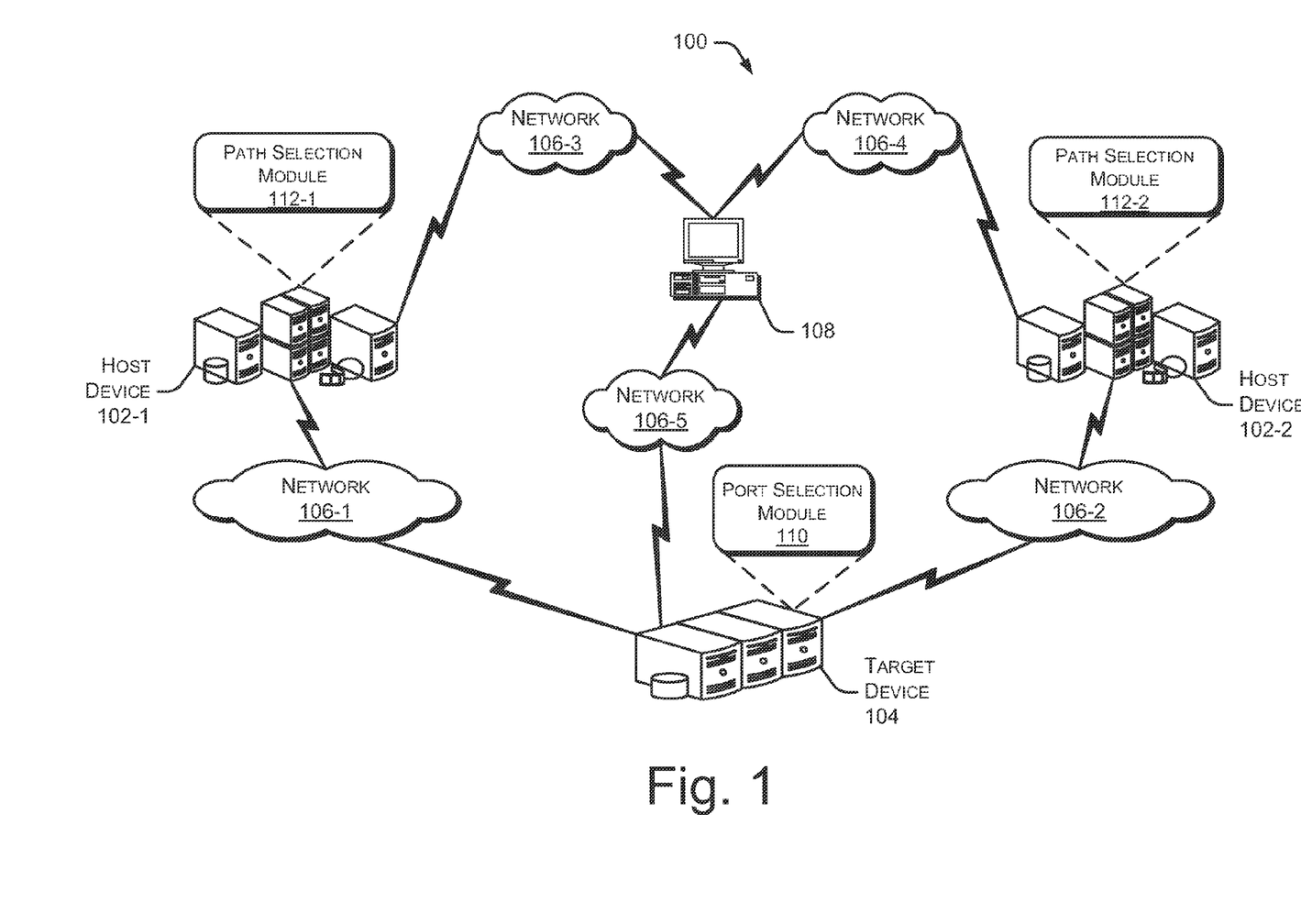
FIG. 1 illustrates a network environment implementing path selection for application commands, in accordance with an embodiment of the present subject matter.

FIG. 1 illustrates a network environment 100 for implementing path selection for application commands, in accordance with an embodiment of the present subject matter. The concepts described herein can be applied to deliver a desired level of QoS in any network environment having a variety of network devices, such as routers, bridges, computing devices, storage devices, servers, etc.

The network environment 100 includes a plurality of host devices, such as host devices 102-1 and 102-2, communicating with a target device 104 via networks 106-1, 106-2, 106-3, 106-4, and 106-5, hereinafter collectively referred to as networks 106. In an implementation, the host devices 102-1 and 102-2 also communicate with an interface console 108. The host devices 102-1 and 102-2, hereinafter collectively referred to as host devices 102, may also interact with each other. Each of the host devices 102 may be a networked computing device, for example, a personal computer, a workstation or a server, which may host various applications and can provide a service to, and request a service from, other devices connected to the networks 106. Further, each of the host devices 102 can also include a host QoS controller (not shown in the figure) to manage sending and receiving of various application commands, such as data read requests and data write requests.

The networks 106 may be wireless or wired networks, or a combination thereof. The networks 106 can be a collection of individual networks, interconnected with each other and functioning as a single large network, for example the Internet or an intranet. Examples of such individual networks include, but are not limited to, Storage Area Networks (SANs), Local Area Networks (LANs), Wide Area Networks (WANs) and Metropolitan Area Networks (MANs). The networks 106 may also include network devices such as hubs, switches, routers, and so on.

In an implementation, the target device 104 has data storage capability and provides, for example, data storage service to one or more of the host devices 102. Examples of the target device 104 include, but are not limited to, workstations, network servers, storage servers, block storage devices, other hosts and so on. In another implementation, the target device 104 may be a network device, such as a router, or a bridge that can manage network traffic by allocating, for example, bandwidth. Generally, the target device 104 includes a target QoS controller (not shown in the figure) to manage processing of various application commands, such as data read requests, data write requests and maintenance requests, received from the host devices 102.

The interface console 108, hereinafter referred to as console 108, can be implemented as any one or combination of a personal computer, a workstation or a laptop, etc. In an implementation, the console 108 facilitates centralized management of network QoS. The console 108 is configured for providing and monitoring QoS to manage, adjust and optimize performance characteristics, such as system and network bandwidth, jitter and latency, of the networks 106. The console 108 may also provide a user interface to facilitate defining QoS level descriptors, which includes I/O usage parameters, bandwidth parameters, sequential access indicators, etc., for achieving the desired level of QoS.

In an implementation, one or more applications executing in the host devices 102 may generate a set of application commands to perform one or more operations, such as read and write operations, at the target device 104. In certain cases, some or all of these application commands may compete with each other for resources, such as storage resources, at the target device 104. The application commands can be regulated to provide the desired level of QoS at the target device 104 based on the QoS level descriptors. The QoS level descriptors can be used for classifying the application commands, and the application commands can then be processed at the target device 104 based on the classification to deliver a requested service at the desired QoS.

In one embodiment, the host devices 102 classify the application commands based on a command parameter, which is associated with each of the application commands. The command parameter acts as a classification parameter based on which the desired QoS can be delivered. The command parameter can be used to classify the application commands at any point of the network environment 100. Examples of the command parameter may include service level information and precedence bits.

The service level information may correspond to, for example, basic end-to-end QoS delivering approaches such as best-effort service, differentiated service, also called as soft QoS, and guaranteed service, also called as hard QoS. Typically, an application is pre-programmed to define a particular service level of an application command based on latency, throughput, and possible reliability expected for the application command. The precedence bits, on the other hand, are generally left blank and are set at the target device 104 to deliver the desired QoS. In an implementation, the precedence bits can be set based on parameters such as logical unit number (LUN) of a disk of the target device 104 and Internet Protocol (IP) addresses of the host devices 102.

As shown, the console 108 may interact with the host QoS controllers associated with the host devices 102 and the target QoS controller associated with the target device 104 through the networks 106-3, 106-4 and 106-5 to deliver centralized QoS management. Accordingly, the console 108 communicates information, such as information related to the application commands, the expected QoS, and any other pertinent information, to the target QoS controller and to the host QoS controllers.

As mentioned previously, the host devices 102 generate and send one or more application commands to the target device 104 over the networks 106. Once the application commands are received at the target device 104, a scheduler (not shown in the figure) at the target device 104 queues the received application commands at one or more ports of the target device 104. Typically, the scheduler allows at least one application command to be processed from each queue after a fixed period of time has elapsed.

In such a case, some application commands may get processed before an expected completion time, or in other words, may get leaked, thereby over-achieving the QoS expected for the application command. An over-achieving application command may affect the QoS associated with other application commands. In an implementation, the scheduler uses a well-known scheduling algorithm, namely the deficit round robin algorithm for allocation of resources to the application commands.

The manner in which the leakage occurs can be better understood through the following example. Let us consider, four different application commands belonging to a first application arriving at different ports, say four of them, of the target device 104 are queued, say on Q1. The scheduler allocates a limited amount of resource, for example, storage resources, for the queue at each port at fixed intervals, say one I/O request every 20 milliseconds, for processing of application commands queued therein. If each application command results in 1 kilobyte of data transfer from the target device 104 to a host device, say 102-1, or vice-versa, the application generating the application command would, with a minimum of one application command per scheduler cycle being processed, accomplish a throughput of 50 kilobytes per second (KBps) at a port of the target device 104. Thus, the application, which might carry a QoS requirement of only 70 kilobytes (KB) for the application commands generated by it, could end up consuming 200 KB, i.e., 50 KB of resources over the four ports that are under consideration. Another application command generated by a second application, and queued on a different queue, say on Q2, which requires more bandwidth (say 250 KBps) for its QoS requirements may not be able to accomplish its pre-set goal owing to competition with the four requests of the first application queued on Q1 across the four ports of the target device 104. On the other hand, if only one request was processed from Q1 in one scheduler cycle across all ports of the target device 104, the workload on Q2 may have attained its desired QoS throughput of 250 KBps. The one-to-one mapping of scheduler to the port of target device 104 leads to more than the desired number of requests, four instead of one, considering the example as described, of a particular queue getting processed, i.e., leaked, at the target device 104. In such a case, the three additional commands that have been processed from Q1 by the target device 104 are considered as "leaked" application commands.

Returning to the description of FIG. 1, the leaked application commands can be detected by the target QoS controller at the one or more ports of the target device 104. The target QoS controller can also obtain information associated with the leaked application commands, such as command parameters. The information associated with the application commands is then provided to a port selection module 110.

Once the information is obtained, the port selection module 110 determines, from amongst the total number of ports at the target device 104, a maximum number of ports of the target device 104. It would be noted that the maximum number of ports would be less than the total number of the ports of the target device 104. In an implementation, the port selection module 110 stores the command parameter and the corresponding maximum number of ports of the target device 104. In another implementation, the port selection module 110 uses the maximum number of ports to determine and store a set of ports of the target device 104. The set can be selected randomly or by using a predefined logic. In an implementation, the stored information can be in the form of a table, an array, or a mapping, and can be sent to one or both of the host devices 102 for storage, say via the console 108.

Further, the host devices 102-1 and 102-2 include respective path selection modules 112-1 and 112-2, hereinafter collectively referred to as path selection modules 112. For a subsequently generated application command at a host device, for example the host device 102-1, the path selection module 112-1 determines a set of ports of the target device 104 to one of which the generated application command is to be directed. The determination of the set of ports is based on the command parameter associated with the subsequent application command and also based on the information received from the port selection module 110.

As mentioned previously, the information provided by the port selection module 110 to the host devices 102 includes the maximum numbers of ports, and the command parameters associated with the leaked application commands. In one implementation, the path selection module 112-1 compares the command parameter associated with the subsequent application command and with the leaked application commands to determine a set of ports corresponding to the command parameter using the information provided by the port selection module 110. The path selection module 112-1 retrieves a maximum number of ports for the command parameter based on the information received from the port selection module 110. Based on the maximum number of ports, the set of ports at the target device 104 are identified, in a random manner or based on a predefined logic.

In another implementation, the information received from the port selection module 110 includes the sets of ports of the target device 104 corresponding to the command parameters of the leaked application commands. In one implementation, the host devices 102 also store information indicating a total number of paths to the target device 104 and numbers of paths that lead to the corresponding ports of the target device 104.

The path selection module 112-1 further selects a set of paths for each of the subsequent application commands based on the corresponding set of ports of the target device 104. The set of ports is used by the path selection module 112-1 to determine the set of paths to the target device 104 by which the subsequent application commands can be routed to one or more ports of the target device 104. In an implementation, the set of paths is a subset of the total number of paths from the host device 102-1 to the target device 104.

The subsequent application command is then sent to the target device 104 along the path selected from the set of paths. It would be appreciated that the path selection may be based upon any of the known algorithms, such as round-robin, least service time, etc. In this manner, the subsequent application commands having command parameters same as those of the leaked application commands are allowed to arrive at a reduced number of ports of the target device 104. Accordingly, the leakage of the application commands that used to occur at the target device 104 prior to the reducing of the number of ports of the target device 104 is reduced. Now, the application commands can arrive and leak only at a reduced number of ports, thereby improving the QoS level at the target device 104.

It will be understood that the foregoing description has been provided with respect to a single host device and a single target device. However, similar concept would also be applicable in a network having multiple hosts and target devices. Furthermore, path allocation for application commands can also be implemented for other scenarios besides controlling QoS in a SAN, or preventing leakage of one or more application commands at ports of the target device, such as target device 104.

Figure 2:
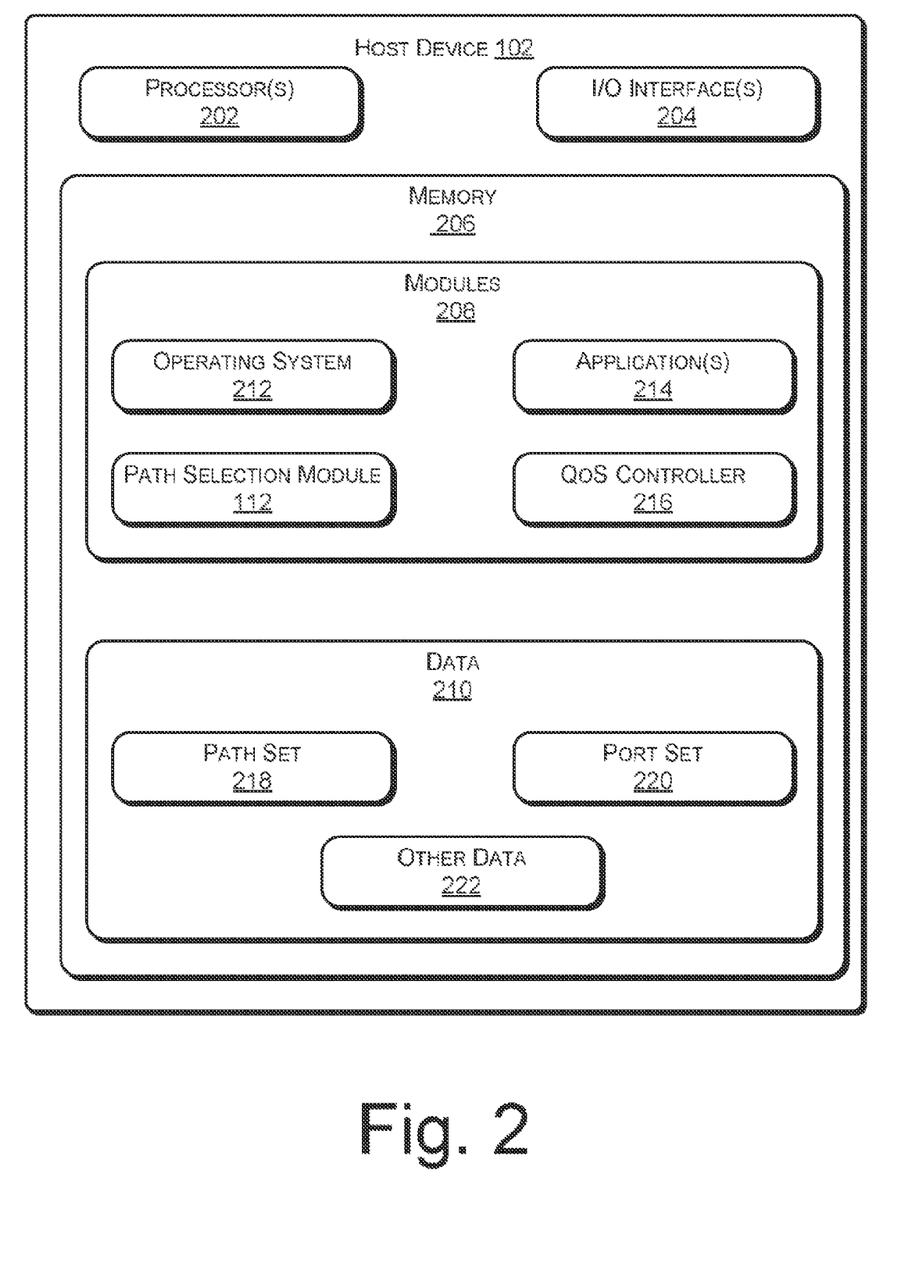
FIG. 2 illustrates exemplary components of a host device, according to an embodiment of the present subject matter.

The systems and devices as introduced in FIG. 1 are further described with reference to FIG. 2. FIG. 2 illustrates exemplary components of a host device, such as the host device 102, according to an embodiment of the present subject matter. The host device may include one or more processor(s) 202, one or more I/O interface(s) 204 and a memory 206. The processor(s) 202 may include microprocessors, microcomputers, microcontrollers, digital signal processors, central processing units, state machines, logic circuitries and/or any devices that manipulate signals and data based on operational instructions. Among other capabilities, the processor(s) 202 is configured to fetch and execute computer-readable instructions stored in the memory 206.

The I/O interface(s) 204 may include a variety of software and hardware interfaces, for example, interface for peripheral device(s) such as data input/output devices, storage devices, network devices, etc. The I/O interface(s) may include Universal Serial Bus (USB) ports, Ethernet ports, Host Bus Adaptors, etc and their corresponding device drivers. The I/O interface(s) 204, amongst other things, facilitate receipt of information by the host device 102 from other devices in the networks 106, such as the target device 104, the console 108, etc.

The memory 206 can include any computer-readable medium known in the art including, for example, volatile memory (e.g., RAM) and/or non-volatile memory (e.g., flash, etc.). The memory 206 further includes modules 208 and data 210. The modules 208 include the path selection module 112, operating system 212, application(s) 214 and a QoS controller 216. The data 210 serve as repositories for storing information associated with the modules 208 and any other information. In an implementation, the data 210 include a path set 218, a port set 220 and other data 222.

As described previously, the host device 102 receives information including command parameters of the application commands that leaked at the target device 104, and maximum numbers of ports of the target device 104 from the port selection module 110. The information received includes sets of ports of the target device 104, where each set corresponds to a respective command parameter. In an implementation, the information can be received by the QoS controller 216 from the console 108 and can be stored in the port set 220.

Further, the QoS controller 216 detects application commands generated at the host device 102 and provides the corresponding command parameters to the path selection module 112. Once the command parameter corresponding to the subsequent application command is obtained, the path selection module 112 retrieves a maximum number of ports of the target device 104 stored in the port set 220. The maximum number of ports is retrieved based on a comparison between the command parameter of the subsequent application command and of the application commands that leaked previously at the target device 104. The path selection module 112, based on a successful comparison, associates the maximum number of ports with the subsequent application command. In an implementation, the port set 220 may include information of sets of ports of the target device 104 corresponding to the command parameters of the leaked application commands.

Once the maximum number of ports is identified, the path selection module 112 determines a set of paths corresponding to the identified ports. In one implementation, the path selection module 112 determines the set of paths from the path set 218. The path set 218 includes information indicating a total number of paths to the target device 104 and numbers of paths that lead to the corresponding ports of the target device 104.

In one implementation, the port selection module 110 further determines the maximum number of ports by identifying the ports at which the application commands are not to be directed. For example, from the total number of ports at the target device 104, a certain number of ports to which the application commands are not to be directed are excluded, giving the maximum number of ports. Further, the path selection module 112 can determine the set of paths by removing paths associated with the ports at which the application commands are not to be directed. In one implementation, the set of paths can be obtained by removing the paths from the path set 218.

Once the path set 218 is determined, the path selection module 112 selects a path from the determined set of paths. It would be appreciated that the path selection may be based upon any of the known algorithms, such as round-robin, least service time, shortest path first, etc. A subsequent application command similar to the one leaked earlier at the target device 104 is then sent to the target device 104 on the selected path through the operating system 212 and the I/O interface(s) 204. In this manner, the subsequent application commands are allowed to arrive at a reduced number of ports. In such a case, any leakage of application commands that would have occurred prior to reducing the number of ports of the target device 104 would get reduced since now the application commands would leak only at a reduced number of ports.

Figure 3:
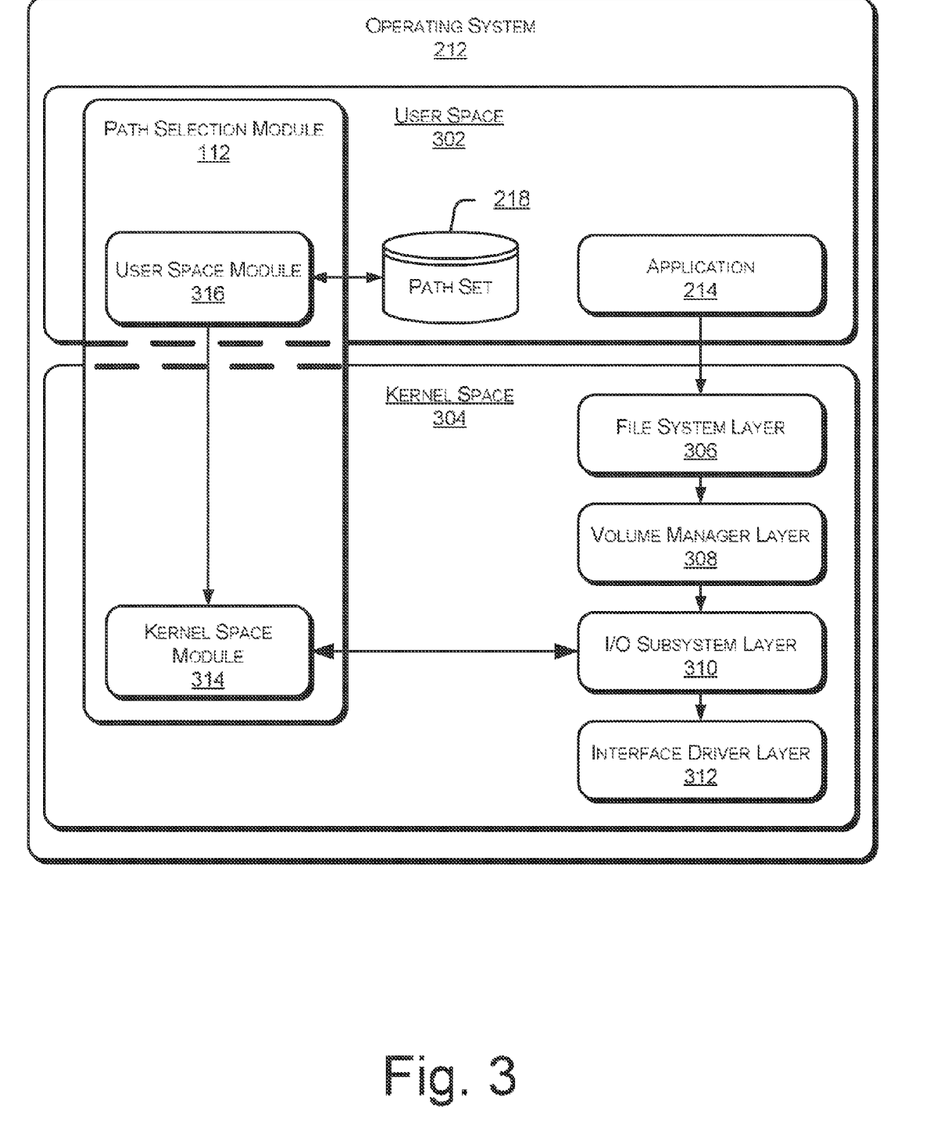
FIG. 3 illustrates interaction of one or more components within an operating system of a host device for implementing path selection for application commands, in accordance with an embodiment of the present subject matter.

FIG. 3 illustrates the interaction of one or more components within the operating system 212 of the host device 102 for implementing path selection for an application command in accordance with an embodiment of the present subject matter. The path selection for an application command is shown with respect to application commands that leaked at one or more ports of the target device 104. However, it would be appreciated that similar methods implemented for application commands other than those that leaked, would also be within scope of the present subject matter. As is shown in FIG. 3, the operating system 212 has a user space 302 and a kernel space 304. The user space 302 refers to the portion of the operating system 212 in which user processes run. The user processes include system processes, such as logon and session manager processes, server processes, and so on. Furthermore, the user space 302 would also include user applications, for example, application(s) 214 executing during runtime.

The kernel space 304, on the other hand, is that portion of the operating system 212 where kernel modules run to manage individual user processes, such as application(s) 214 within the user space 302. The kernel modules are also configured to prevent the user processes from interfering with each other through various operations, such as thread scheduling, interrupt and exception handling, low-level processor synchronization, recovery after power failure. The kernel modules are generally implemented across various stack layers of the operating system 212 and may include a file system layer 306, a volume manager layer 308, an I/O subsystem layer 310 and an interface driver layer 312.

In an embodiment, the operating system 212, which also includes the path selection module 112, is so configured as to have sub-modules distributed across both the user space 302 and the kernel space 304. In one implementation, the portion of the path selection module 112 existing in the user space 302 and the kernel space 304 is user space module 316 and kernel space module 314, respectively. The kernel space module 314 can interact with any of the higher OS stack layers, such as the I/O subsystem layer 310, or the volume manager layer 308 or the file system layer 306, in the kernel space 304. The I/O subsystem layer 310 is responsible for handling I/O commands and includes disk drivers. Disk drivers are software that facilitate a disk drive to interact with the operating system 212. In one embodiment, the kernel space module 314 is located in the disk driver included in the I/O subsystem layer 310. The user space module 316 is located in the user space 302 of the operating system 212.

At the time of execution, the application(s) 214 in the user space 302 generate one or more application commands for performing one or more operations. Generally, the application commands traverse through the file system layer 306 and are classified at the volume manager layer 308 using various workload management tools and techniques, such as HP-UX process resource manager (PRM). These workload management tools and techniques manage system resources, such as CPU resources, memory, and disk bandwidth allocated to a workload such as the application(s) 214.

Typically, an application command is classified to include at least one command parameter, such as a group identification (ID), that can identify an application generating the application command. For example, in case of HP-UX operating system, the application command can be identified by a group ID. As will be explained, the command parameter is used to deliver QoS in the host device 102. Once classified, the application command reaches the I/O subsystem layer 310. In one implementation, the application command from the application(s) 214 can be routed through the file system layer 306 and the volume manager layer 308, or from the file system layer 306 bypassing the volume manager layer 308, or directly from the application(s) 214 to the I/O subsystem layer 310.

Upon receiving the application command, the I/O subsystem layer 310 invokes the kernel space module 314 to fetch a path to the target device 104 corresponding to the command parameter. The user space module 316 selects a set of paths, say from the path set 218, and provides it to the kernel space module 314. The set of paths can be selected based on the command parameter associated with the application command. The kernel space module 314 is invoked by the I/O subsystem layer 310 for each application command.

For example, the path selection module 112 compares the command parameter of the subsequent application command under consideration with the command parameters of the application commands that had previously leaked at one or more ports of the target device 104. For these subsequent application commands, the maximum numbers of ports as provided by the port selection module 110 is obtained. Based on the maximum number of ports a set of paths is selected from the path set 218. The set of paths so obtained, as will be appreciated, is a subset of a total number of paths from the host device 102 to the target device 104.

The set of paths, when received, is passed to the kernel space module 314. The kernel space module 314 then selects a path from the set of paths and passes the associated path information to the disk driver in the I/O subsystem layer 310.

The disk driver selects the appropriate interface driver instance to pass the application command to. The application command is then sent to the target device 104 from the host device 102 through the interface(s) 204, such as a host adaptor, by the interface driver layer 312.

In an implementation, the kernel space module 314 caches the path information in an associated cache memory (not shown in the figure). Caching of the path information facilitates quick retrieval of the path information for another application command, which has the same command parameter. Though the above description is provided with reference to interactions between the kernel space module 314 and the disk driver in the I/O subsystem layer 310, it will be understood that the kernel space module 314 may interact with other layers as well, as mentioned earlier. It will also be appreciated that the host device 102 can be implemented in a virtual machine (VM) environment using a variety of system architectures, for example, Hyper-V architectures, wherein the operating systems have OS stack layers, such as the file system layer 306 and the volume manager layer 308, similar to the OS 214.

Figure 4:
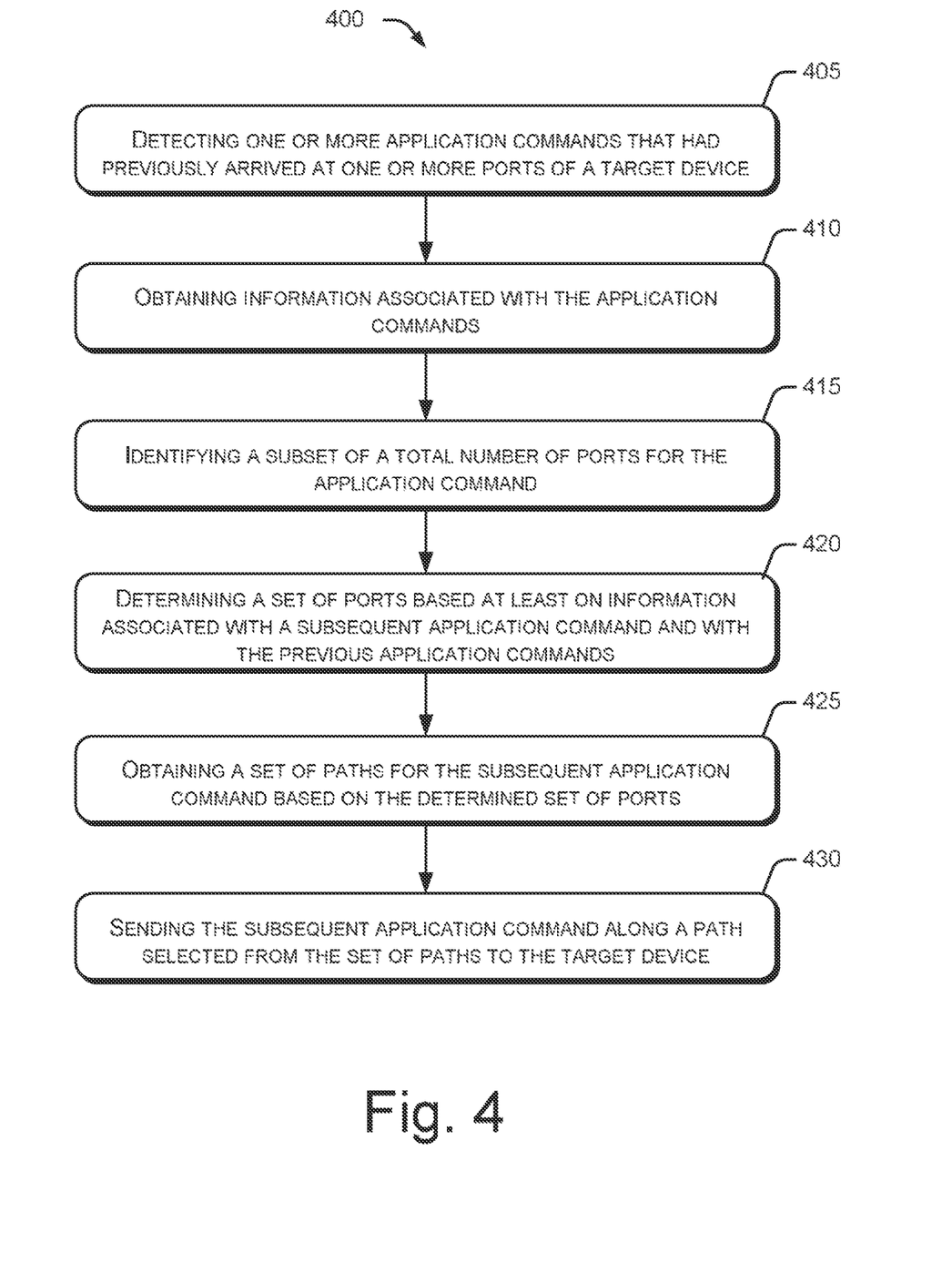
FIG. 4 illustrates an exemplary method for path selection for application commands, according to an embodiment of the present subject matter.

FIG. 4 illustrates an exemplary method for path selection for application commands according to an embodiment of the present subject matter. These exemplary methods may be described in the general context of computer executable instructions. Generally, computer executable instructions can include routines, programs, objects, components, data structures, procedures, modules, functions, and the like that perform particular functions or implement particular abstract data types. The computer executable instructions can be stored on a computer readable medium and can be loaded or embedded in an appropriate device for execution.

The order in which the method is described is not intended to be construed as a limitation, and any number of the described method blocks can be combined in any order to implement the method, or an alternate method. Additionally, individual blocks may be deleted from the method without departing from the spirit and scope of the invention described herein. Furthermore, the method can be implemented in any suitable hardware, software, firmware, or combination thereof.

At block 405, one or more application commands that had previously arrived at one or more ports of a target device are detected. In one implementation, a target QoS controller (not shown in the figure) detects one or more application commands arriving at one or more ports of the target device 104. In another implementation, the target QoS controller detects one or more application commands that leaked at the ports of the target device 104. The application commands are said to have leaked when they are processed before an expected completion time.

At block 410, information associated with the application commands is obtained. In one implementation, the target QoS controller obtains the information associated with the application commands. As mentioned previously, the target QoS controller can also obtain information associated with application commands that leaked at one or more ports of the target device 104. The information obtained is then provided to the port selection module 110. In one implementation, the information associated with the application commands includes command parameters. In another implementation, the information is available to the host devices 102.

At block 415, a subset of a total number of ports of the target device is identified for the application commands. In one implementation, the port selection module 110 determines a maximum number of ports of the target device 104, say for each leaked application command. The port selection module 110 can also store a command parameter and a corresponding maximum number of ports of the target device 104. In an implementation, a set of information pertaining to the maximum number of ports is stored as port set 220.

At block 420, for a subsequently generated application command at a host device, a set of ports of the target device is determined. In one implementation, the determination of the set of ports of the target device 104 is based on the command parameter associated with the subsequent application command and the information received from the port selection module 110, for example, information associated with a previously arrived application command, a previously leaked application command, etc. In another implementation, the port selection module 110 considers the maximum number of ports to determine and store the set of ports of the target device 104 in the port set 220. The selection of the set of ports can be random or based on a predefined strategy.

At block 425, a set of paths for directing the subsequent application command to the target device is obtained, based on the determined set of ports. The determination is based on the set of ports of the target device, as determined above. In one implementation, the path selection module 112 determines a set of paths corresponding to the identified ports. The set of paths is a subset of a total number of paths from a host device, say 102-1, to the target device 104. In an implementation, the determination of the set of paths is done by the user space module 316.

At block 430, the subsequent application command is sent to the target device on a path selected from the set of paths. In one implementation, once the set of paths is determined from the path set 218, the path selection module 112 selects a path from the determined set of paths. The path selection may be based upon any of the known algorithms such as round-robin, least service time, and shortest path first. The subsequent application command is then sent to the target device 104 on the selected path through the operating system 212 and the I/O interface(s) 204.

In this way, path allocation of application commands can be implemented, directing one or more application commands to a reduced number of ports. Furthermore, in a similar manner, if the previous application commands had leaked, the subsequent application commands can be directed to a reduced number of ports at the target device, such as target device 104. In such a case, subsequent application commands that are now directed to a reduced number of ports, would leak less as a result of the reduced number of ports.

Although embodiments for path selection of application commands have been described in language specific to structural features and/or methods, it is to be understood that the invention is not necessarily limited to the specific features or methods described. Rather, the specific features and methods are disclosed as exemplary implementations for the classification of application commands.

We claim:

1. A method comprising:
   receiving, at a host device, information associated with at least one application command that was processed at least one port of a target device;
   determining, at the host device, a set of ports of the target device for at least one subsequent application command, generated at the host device, to be routed to the target device, based at least on comparison of an information associated with the at least one subsequent application command and the information associated with the least one application command that was processed at the at least one port of the target device; and
   directing the at least one subsequent application command to at least one port from the set of ports of the target device based on the determining.

2. The method as claimed in claim 1, wherein the at least one application command that was processed at the at least one port of the target device leaked.

3. The method as claimed in claim 2, wherein the determining the set of ports of the target device comprises:
   obtaining a number of ports based on the ports of the target device at which the at least one application command leaked;
   comparing the information associated with the at least one subsequent application command with the information associated with the at least one application command that leaked; and
   selecting, based on the ports at which the at least one application command leaked, the set of ports of the target device for the at least one subsequent application command.

4. The method as claimed in claim 1, wherein the directing comprises:
   associating the set of ports of the target device with a plurality of paths for routing the at least one subsequent application command; and
   routing the subsequent application command to the at least one port through a path selected from the plurality of paths.

5. The method as claimed in claim 1, wherein the information comprises at least one command parameter including a classifier identification.

6. A computing system comprising:
   a processor; and
   a memory coupled to the processor, wherein the memory comprises:
     a path selection module configured to,
       obtain at least one command parameter associated with an application command to be routed to a target device, wherein the command parameter identifies an application that generated the application command;
       determine a set of ports of the target device for the application command, based, at least in part, on the command parameter associated with an another application command that was previously processed at the target device; and
       route the application command to at least one port selected from the set of ports.

7. The system as claimed in claim 6, wherein the previously processed application command leaked at least one port of the target device.

8. The system as claimed in claim 6, wherein the path selection module is further configured to:
   identify at least one path associated with the ports included in the set of ports; and
   based on the identified path, route the application command through the identified path to the at least one port.

9. The system as claimed in claim 8, wherein the at least one path is selected from a predefined path set.

10. The system as claimed in claim 9, wherein the path selection module selects the at least one path based on a procedure selected from a group consisting of a round-robin procedure, least service time procedure and shortest path first procedure.

11. A computer-readable medium having computer-executable instructions that when executed perform acts comprising:

obtaining at least one command parameter from information associated with an application command generated at a host device;

obtaining a set of ports of a target device based at least in part on the information associated with the application command and the information associated with at least one application command that leaked; and directing the application command to at least one port selected from the set of ports of the target device.

12. The computer-readable medium as claimed in claim 11, further comprising instructions for obtaining the set of ports based on a number of ports of the target device at which the at least one application command leaked.

13. The computer-readable medium as claimed in claim 11, further comprising instructions for associating a set of paths with the set of ports.

14. The computer-readable medium as claimed in claim 11, wherein the information associated with the at least one application command that leaked includes a command parameter.

15. The computer-readable medium as claimed in claim 11, wherein the information associated with the at least one application command that leaked is stored at the host device.

\* \* \* \* \*

UNITED STATES PATENT AND TRADEMARK OFFICE
CERTIFICATE OF CORRECTION

PATENT NO. : 8,694,699 B2  
APPLICATION NO. : 12/794594  
DATED : April 8, 2014  
INVENTOR(S) : Kishore Kumar Muppirala et al.

Page 1 of 1

It is certified that error appears in the above-identified patent and that said Letters Patent is hereby corrected as shown below:

In the Claims

In column 11, line 58, in Claim 1, delete "processed" and insert -- processed at --, therefor.

In column 12, line 50, in Claim 7, delete "leaked" and insert -- leaked at --, therefor.

Signed and Sealed this  
Twelfth Day of August, 2014

Michelle K. Lee  
*Deputy Director of the United States Patent and Trademark Office*